United States Patent [19]

Shimada

[11] Patent Number: 5,091,683
[45] Date of Patent: Feb. 25, 1992

[54] SERVO CONTROL APPARATUS
[75] Inventor: Akira Shimada, Tokyo, Japan
[73] Assignee: Seiko Instruments Inc., Japan
[21] Appl. No.: 580,642
[22] Filed: Sep. 10, 1990
[30] Foreign Application Priority Data
  Sep. 20, 1989 [JP] Japan .................................. 1-244048
[51] Int. Cl.$^5$ ............................................. G05B 13/00
[52] U.S. Cl. .............................. 318/561; 318/568.11; 318/568.21; 318/568.22; 364/151
[58] Field of Search .............. 318/561, 568.11, 568.21, 318/568.22; 364/151

[56] References Cited
U.S. PATENT DOCUMENTS 4,696,167  9/1987  Matsui et al. ........................ 364/151
4,874,998  10/1989 Hollis, Jr. ........................ 318/568.21
4,943,759  7/1990  Sakamoto et al. ............. 318/568.11

Primary Examiner—William M. Shoop, Jr.
Assistant Examiner—Saul M. Bergmann
Attorney, Agent, or Firm—Bruce L. Adams; Van C. Wilks

[57] ABSTRACT

A servo control apparatus controls an object according to a target position signal and a detected position signal and drives the object according to a drive torque signal. The servo control apparatus includes an observer receptive of the drive torque signal and the detected position signal which determines an estimated disturbance torque in response thereto. A function unit produces an error command signal dependent on the estimated disturbance torque. The error command signal is successively subtracted from the target position signal to set a temporary position signal which is effective to impart a mechanical compliance to the control object.

7 Claims, 2 Drawing Sheets

SERVO CONTROL APPARATUS

BACKGROUND OF THE INVENTION

The present invention relates to a servo control apparatus having functions to control position, velocity or force and having a programming or teaching function for use in, for example robot manipulators, machine tools and XY tables.

Conventionally, when teaching a position to a control object, driving of a mechanical actuating system is temporarily stopped to hold an actuator in a nonexcited state and the control object is manually displaced. Accordingly, since the control object bears a load due to the force of gravity etc., the the force of gravity must be compensated for by means of a bias spring or counter balance. On the other hand, when teaching is done by exciting the actuator to directly drive the object, a force sensor etc. is used to measure an external force and to feed back the measured external force.

However, the mechanical structure becomes complicated when providing in the structure a balance mechanism to compensate for the force of gravity, resulting in increased weight and cost. Further there is a limit in drive performance resulting in great force being required to displace the control object under the nonexcited state. Moreover, if the mechanical structure has a relatively great velocity reduction rate, it would be difficult to drive the control object.

SUMMARY OF THE INVENTION

An object of the present invention is stably to provide a servo control apparatus which is operable by a light force without requiring any counter balance structure and which does not need any additional force sensor etc.

According to the present invention, an observer is provided to estimate a disturbance torque according to the observer theory in order to realize the above noted object of the invention by utilizing the estimated disturbance torque for object control. The observer estimates the disturbance torque based on a detected position signal from a position detector and a drive torque signal applied to the control object in the mechanical drive control system. An error command signal is produced successively dependent on the estimated disturbance torque to indicate influence of the actual disturbance torque. The error command data is subtracted from target position data to set a temporary position data with each sequence of the drive to thereby impart mechanical compliance to the control object. By such construction, the object can be driven controllably with the mechanical compliance characteristic against an incidental or intentional disturbance torque. Further, the control object can be displaced intentionally for teaching under the non-excited state.

The observer operates to estimate a disturbance load or torque which may be generated by a change in acceleration due to electrostatic friction, elasticity, viscosity or load variation, or by an external force, based on both a drive torque or drive current generated by the actuator and current detected position data of the control object. In order to estimate only an intentional external force component, a pure disturbance torque component is arithmetically subtracted from the observed total disturbance torque by means of a function unit to produce the error command data which is proportional to the net magnitude of the intentional force. The original target position data is compensated by the error command data by successively subtracting the error command data from the original target position data to thereby set a temporary position data, thereby imparting mechanical compliance to the control object. Accordingly, when applying an intentional external force, the control object can respond to the applied force with soft resistance. After the external force is removed, the control object is restored to the original target position.

Further, by replacing or rewriting the original target position data by the temporary position data, the control object can be displaced without resisting the external force and can stop at a final destined position when removing the external force without returning to the original target position. Moreover, there may be provided a function to memorize the successive detected positions while smoothly displacing the object by the external force to thereby carry out teaching to the control object.

DETAILED DESCRIPTION OF EMBODIMENTS

Figure 1:
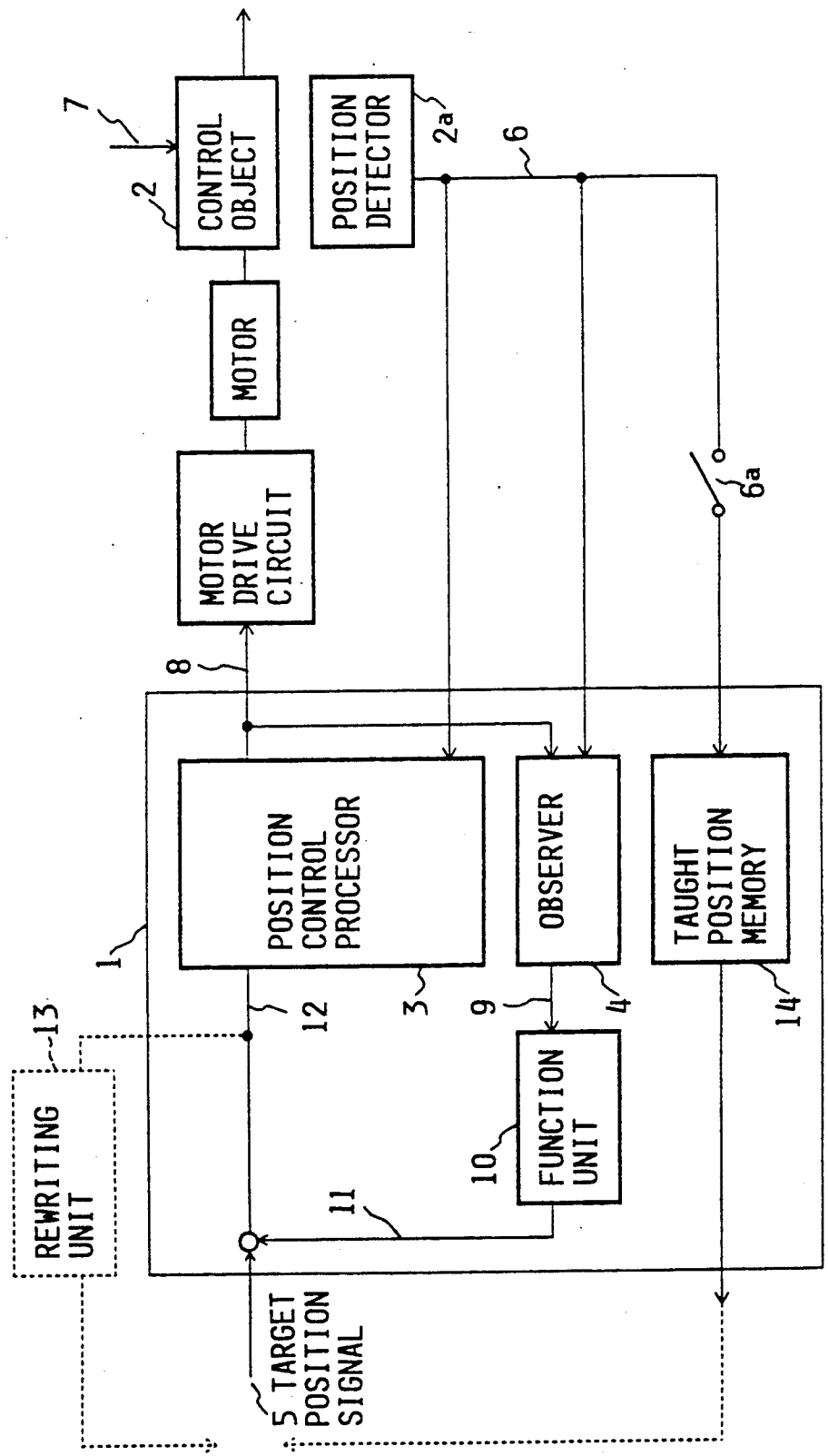
FIG. 1 is a schematic block diagram showing the inventive servo control device having a disturbance torque observer, means for correcting a target position data and a memory for memorizing a taught position.

A preferred embodiment of the invention is described in conjunction with the drawings, in which a control object is of a rotation system. Referring to FIG. 1, the servo control device 1 includes a position control processor 3 which operates to compare a temporary position signal 12 with a detected position signal 6 from a position detector 2a which detects a position of a control object 2 to carry out the calculation needed for control. For example, the position control processor 3 calculates a drive torque based on the compared results of deviation to thereby output a drive torque signal 8 effective to actuate a motor through a motor drive circuit.

On the other hand, a disturbance torque or force observer 4 receives the drive torque signal 8 and the detected position signal 6 to process these signals 8 and 6 to output an observed or estimated disturbance torque signal 9 to an error signal producing means or function unit 10. The function unit 10 carries out operation through a proportional function etc. having a compliance coefficient, based on a pure disturbance torque observed before the control object 2 is applied with an intentional force so as to intentionally displace a robot arm. The function unit 10 processes the observed disturbance torque signal 9 to produce an error command signal 11. For example, when applying an intentional force to the control object 2, the servo control device 1 receives a control signal through a sensor or switch. In response to the control signal, the function unit 10 operates as described above to subtract the previous observed disturbance torque which has been estimated immediately before the external force is applied from the current observed disturbance torque which is estimated after the external force is applied to thereby calculate a net magnitude of the external force to produce the error command signal 11. Then, the error command signal 11 is subtracted from the original target position signal 5 to produce the temporary position signal 12.

Consequently, the target position signal is successively corrected according to change of the external and intentional force to provide mechanical compliance characteristic for the external force. When removing the intentional force, the error command signal 11 becomes zero such that the temporary position signal 12 coincides with the original target position signal 5 so that the control object 2 returns to the original position.

Further, when displacing the control object 2 to carry out direct teaching by applying an intentional force to the control object 2, a switch 6a is closed at request so that a taught position memory 14 operates to memorize the detected position signal 6. The memorized taught position data is retrieved at request and is inputted into the servo control device 1 as the original target position signal 5 so that the object can be driven to the taught position.

Moreover, as shown in FIG. 1, a rewriting unit 13 is optionally added to rewrite the original target position signal 5 with the temporary position signal 12. Namely, the original target position signal 5 is successively replaced by the temporary position signal 12. Consequently, the control object 2 is shifted according to the intentional force and then is stopped when the intentional force is removed without returning to the original position, because the original target position signal is replaced by the subsequent temporary position signal. Therefore, by applying the external force, the control object is displaced to a desired position which can be memorized in the memory 14 as the taught position to thereby carry out direct programming or teaching.

The next description is given for the operation of the disturbance torque observer according to the following equations:

motion equation: $Tm = J\ddot{\theta} + TL$ (1)

state equation: $\dot{X} = AX + BU$ (2)
$Y = CX$ (3)

definition: $x_1 = \theta, u = Tm$ (4)
$x_2 = \dot{\theta}, y = x_1 = \Theta$
$x_3 = TL$ assumption: $\frac{d}{dt} TL = 0$ (5)

$$\begin{bmatrix} \dot{X}_1 \\ \dot{X}_2 \\ \dot{X}_3 \end{bmatrix} = \begin{bmatrix} 0 & 1 & 0 \\ 0 & 0 & -1/J \\ 0 & 0 & 0 \end{bmatrix} \begin{bmatrix} X_1 \\ X_2 \\ X_3 \end{bmatrix} + \begin{bmatrix} 0 \\ 1/J \\ 0 \end{bmatrix} u \quad (6)$$

$$y = [100] \begin{bmatrix} X_1 \\ X_2 \\ X_3 \end{bmatrix} \quad (7)$$

The first relation (1) is an equation of motion with respect to the control object where Tm denotes a drive torque generated by a motor, $\theta$ denotes an angular position of the object, J denotes an inertia moment, $T_L$ denotes a disturbance torque and a dot mark "." denotes time differential operation. In order to obtain a disturbance torque observation, the control object is represented by the state equations (2) and (3). Then, the first equation of motion (1) is represented by the state equations (6) and (7) based on the definition (4) and the assumption (5).

By applying Gopinath's minimal order observer method to the state equations (6) and (7), there are obtained the following equations (10) and (11) which are detailed forms of the following equations (8) and (9), where respective state variables are indicated by the following equation (12):

$$\hat{\tilde{Z}} = \tilde{A}\tilde{Z} + \tilde{B}\tilde{U} \quad (8)$$

$$\hat{\tilde{X}} = \tilde{C}\tilde{Z} + \tilde{D}\tilde{U} \quad (9)$$

$$\begin{bmatrix} \dot{z}_1 \\ \dot{z}_2 \end{bmatrix} = \begin{bmatrix} -L_1 & -i/J \\ -L_2 & 0 \end{bmatrix} \begin{bmatrix} z_1 \\ z_2 \end{bmatrix} + \begin{bmatrix} -L_1 & -L_2/J & 1/J \\ -L_1 & L_2 & 0 \end{bmatrix} \begin{bmatrix} y \\ u \end{bmatrix} \quad (10)$$

$$\begin{bmatrix} \hat{x}_1 \\ \hat{x}_2 \\ \hat{x}_3 \end{bmatrix} = \begin{bmatrix} 0 & 0 \\ 1 & 0 \\ 0 & 1 \end{bmatrix} \begin{bmatrix} z_1 \\ z_2 \end{bmatrix} + \begin{bmatrix} i & 0 \\ L_1 & 0 \\ L_2 & 0 \end{bmatrix} \begin{bmatrix} y \\ u \end{bmatrix} \quad (11)$$

$$\hat{x}_1 = y = \theta \quad \hat{\dot{\theta}} = \hat{x}_2 \quad \hat{T}_L = \hat{x}_3 \quad (12)$$

Where $L_1$ and $L_2$ denote parameter constants which determine eigen values of the control system and which are set so as to ensure the system stability. In the process in which the observer repeats arithmetic operations for estimation, pole (eigen value) of the function which constitutes the observer must be negative so that the estimated value does not diverge but converges. The observer in this state is said to be stable. However, when the observer is designed on the basis of digital control theory, the pole becomes stable when the absolute-value is less than one. The pole of the observer is represented as the function of $L_1$ and $L_2$. $L_1$ and $L_2$ are parameter variables which a designer can set freely, and they are unrelated to characteristics of the control object. Therefore, $L_1$ and $L_2$ are set so as to stably converge the pole of the observer. The third relation of the equation (12) shows an observed disturbance torque.

Figure 2:
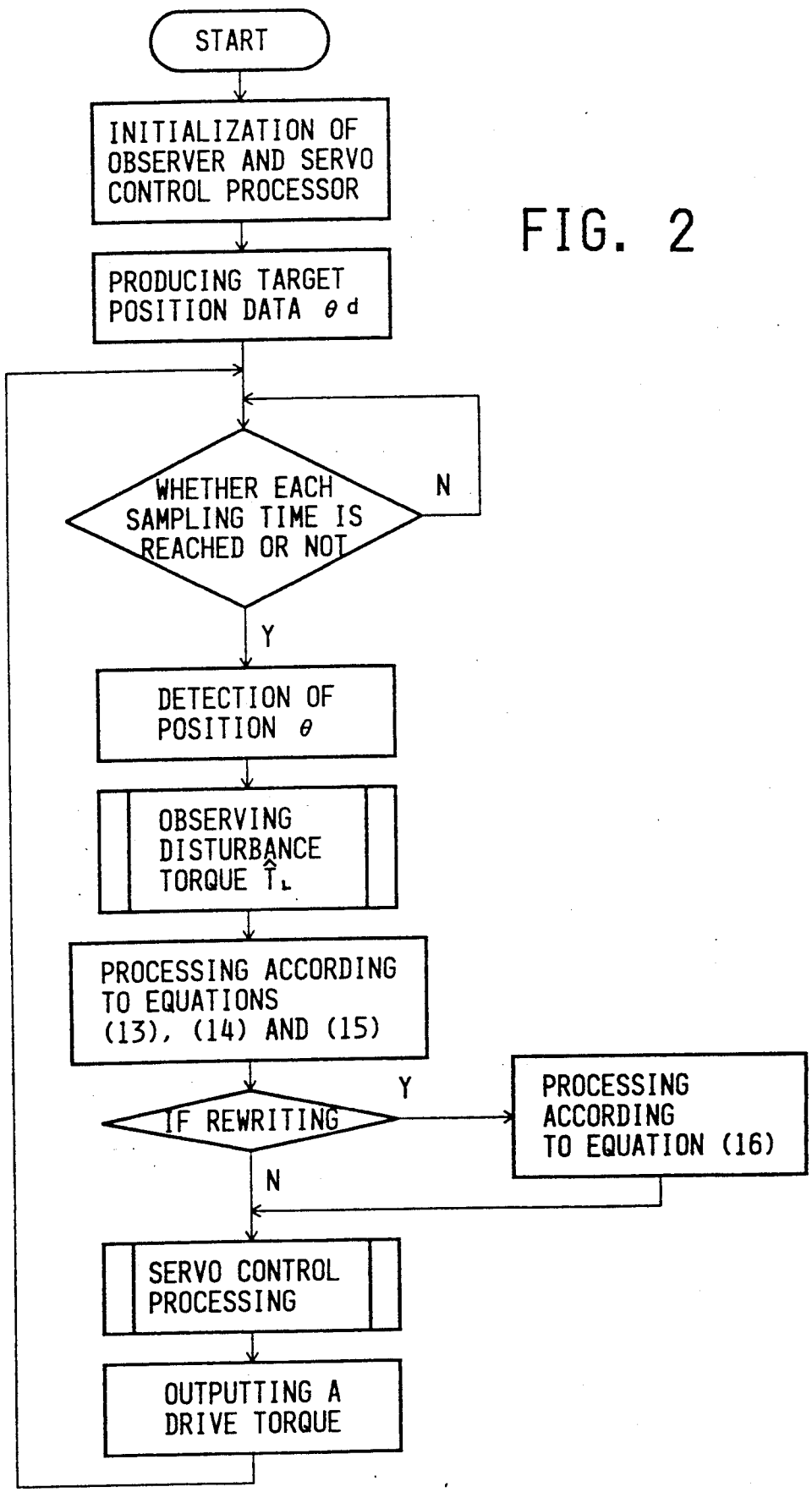
FIG. 2 is a flow chart illustrating the operation sequence of the FIG. 1 device.

The last description is given for the operation of the servo control device in conjunction with a flow chart shown in FIG. 2 and the following equations:

$$\Delta \hat{T}_L = \hat{T}_L - \hat{T}_{LO} \quad (13)$$
$$\Delta \theta = C \cdot \Delta \hat{T}_L \quad (14)$$
$$\theta_{TMP} = \theta_d - \Delta \theta \quad (15)$$
$$\theta_d = \theta_{TMP} \quad (16)$$

When an intentional force is applied to the control object, the observed disturbance torque $\hat{T}_L$ may contain a pure disturbance torque component $\hat{T}_{LO}$ due to change in friction, elasticity, viscosity or load and an intentional external force component $\Delta \hat{T}_L$.

Therefore, as indicated by the equation (13), the pure observed disturbance torque $\hat{T}_{LO}$ estimated before the application of the intentional force is subtracted from the observed total disturbance torque $\hat{T}_L$ estimated after the application of the intentional force to calculate the estimated intentional torque $\Delta \hat{T}_L = \hat{T}_L - \hat{T}_{LO}$. Then, the estimated intentional torque $\Delta \hat{T}_L$ is multiplied by a compliance coefficient C effective to impart the mechanical compliance characteristic to thereby produce the error command signal $\Delta \theta$ as indicated by the equation (14). Then, the temporary position data $\theta_{TMP}$ is determined by the difference between the original target position data $\theta_d$ and the error command data, i.e., $\theta_{TMP}=\theta_d-\Delta\theta$ as indicated by the equation (15). On the other hand, when rewiting the target position data by the temporary position data, $\theta_d$ is replaced by $\theta_{TMP}$ as indicated by the equation (16). The above processing is repeatedly carried out through a routine loop according to the FIG. 2 flow chart after initializing various data.

For example, when a robot grips a load having unknown weight, unknown variation is induced in dynamic characteristic parameters of the robot. Generally, the parameters such as elasticity, viscosity and friction are changed depending on ambient temperature and humidity in the mechanical drive system of the robot. The torque variation due to the parameter change may affect the control system as a disturbance torque. The inventive control device can operate under such conditions to observe an intentional or external torque without using a sensor to thereby manually displace the robot to teach a position.

What is claimed is:

1. A servo control apparatus for controlling an object according to a target position signal and for driving the object by a drive torque signal, comprising:
    an observer receptive of the drive torque signal and a detected position signal of the object for observing a disturbance torque applied to the object;
    means for producing an error command signal dependent on the observed disturbance torque; and
    means for successively subtracting the error command signal from the target position signal to determine a temporary position signal effective to impart a mechanical compliance to the control object.

2. A servo control apparatus according to claim 1, further comprising means for memorizing the detected position signal of the control object when shifted by an intentional disturbance torque so as to effect position programming of the control object position.

3. A servo control apparatus for controlling an object according to a target position signal and for driving the object by a drive torque signal, comprising:
    an observer receptive of the drive torque signal and a detected position signal of the object for observing a disturbance torque applied to the object;
    means for producing an error command signal dependent on the observed disturbance torque;
    means for subtracting the error command signal from the target position signal to set a temporary position signal; and
    means for rewriting successively the target position signal with the temporary position signal so as to displace the object in response to an intentional disturbance torque applied to the object.

4. A servo control apparatus according to claim 3, further comprising means for memorizing a displaced position of the object to effect position programming of the object position.

5. A servo control apparatus for controlling an object according to a target position signal and a detected position signal and for driving the object by a drive torque signal, comprising:
    observing means responsive to the drive torque signal and the detected position signal for observing a disturbance torque and generating a disturbance torque signal;
    error signal producing means for producing an error signal dependent on the disturbance torque signal;
    subtracting means for subtracting the error signal from the target position signal to produce a temporary position signal; and
    processing means for processing the detected position signal and the temporary position signal and generating the drive torque signal in response thereto.

6. A servo control apparatus according to claim 5, further comprising memorizing means for memorizing the detected position signal and operable in response to an intentional disturbance torque to effect position programming of the object position.

7. A servo control apparatus according to claim 5, further comprising rewriting means for rewriting the target position signal with the temporary position signal and operable to displace the object in response to an intentional disturbance torque.

* * * * *